3,238,050
ION SENSITIVE GLASS

Edwin P. Arthur, Fullerton, and Robert W. Nolan, South Laguna, Calif., assignors to Beckman Instruments, Inc., a corporation of California
No Drawing. Filed Nov. 12, 1964, Ser. No. 410,749
7 Claims. (Cl. 106—52)

This application is a continuation-in-part of our copending application entitled "Ion Sensitive Glass," Serial No. 95,247, filed March 13, 1961, assigned to the assignee of the present application, now abandoned.

This invention relates to an ion sensitive glass for use in electrodes for ion potential measurements and, in particular, to an alkali metal silicate glass containing either yttria alone or yttria plus a metal oxide of the lanthanide series, as a stabilizer. As used herein the phrase "lanthanide series" includes the metals with atomic numbers 57 through 71.

Electrodes with ion sensitive glass bulbs or membranes are used extensively in analysis of solutions by ion potential measurement, the most common measurements being that of hydrogen ion concentration or pH. The innate character of the glass membrane is one of the limiting factors in the design of pH meters. The glass must be responsive to the particular ion of interest and nonresponsive to other ions which may be present. It should have a relatively short response time and especially a low resistance.

The resistance across the bulbs of common ion sensitive glasses is generally one to two hundred megohms. Consequently, it is a common practice to measure the potential across the bulbs with a very high input impedance device such as an electrometer amplifier. The required extremely high input impedance has many disadvantages. Because only a very low amount of energy is required to influence the input, the measuring device becomes extremely susceptible to varying electrostatic fields. In other words, an electrode having a very high impedance membrane has a tendency to pick up extraneous electrostatic fields with the result that highly efficient shielding techniques have to be used in order to achieve freedom from noise. Low impedance or resistance, therefore, is a very desirable feature in an ion sensitive glass membrane.

It is known that relatively low resistance characteristics may be achieved by increasing certain components of the glass such as alkali metals at the expense of silica. Such glasses exhibit useful ion sensitivity characteristics but many problems are encountered in the stabilization of such glasses. An alkali metal silicate glass with alumina, for example, is ordinarily responsive to more than one ion, resulting in large sodium ion errors. When calcium is used as the stabilizer in an alkali silicate, for example lithia silicate, the resulting glass is reported to be very unstable and disintegrates in air. Lead and some alkaline earths have been used as stabilizers but the presence of these components adversely affect the low electrical resistance characteristics of the glass. Therefore, what is needed is a silicate glass free of the conventional stabilizers mentioned above and associated disadvantages and having instead a stabilizer which permits the glass to incorporate sufficient alkali metal so as to have the desired low electrical resistance, therefore, dispensing with the requirement of high impedance input amplifiers. Furthermore, such a glass must have acceptable mechanical properties to render it useful for commercial manufacture into glass electrodes. The mixed raw materials must be fusible into isotropic glass at practical melting temperatures; the resultant magma should be relatively fluid and refinable to bubble-free condition. The resultant glass should be mechanically strong to resist shock and impact and above all be stable in air, water and other fluids to which the electrode may be exposed in use.

It is, therefore, the principal object of the present invention to provide a new and improved glass for use in ion potential measurements which glass will have the necessary electrical and mechanical characteristics mentioned above and, as the most important feature, will have a resistance in the order of only one-tenth to one-hundredth of that of conventional electrode glasses.

Another object of the invention is to provide a new glass for an ion sensitive membrane in the form of a vitreous single alkali metal silicate which is free from lead and the alkaline earths of Group II of the periodic chart of the elements, which has extremely low resistance and relatively low sodium error.

According to the principal aspect of the present invention, it has been discovered that an extremely low resistance alkali silicate glass may be provided by incorporating in the glass as a stabilizer, yttrium oxide, which permits the use of a relatively high amount of the alkali metal. The invention is limited to single alkali metal silicate glasses, namely, glasses containing either lithium or sodium. It has been found that these alkali metals may be incorporated in silicate glasses in the order of 28 to 38 mol proportions, thus resulting in glasses which may be formed into bulbs having a resistance of about 6 megohms or less, by utilizing yttrium oxide as the stabilizer.

According to another aspect of the invention, it has been found that a single alkali metal silicate glass incorporating yttria as the stabilizer, therefore having the advantage of very low resistance, also has low alkali error by incorporating in the glass a minor quantity of an oxide of the lanthanide series.

Alkali silicate ion sensitive glasses including oxides of the lanthanide series are known for instance from U.S. Patent No. 2,497,235 to Perley. This patent discloses glasses comprising silica, lithium, and in most cases, another alkali metal, and varying molar proportions of lanthanum or one or more other metals of the lanthanide series. These glasses are stated to have, in certain instances, low sodium error, meaning a desirable freedom of response to sodium ions which is desirable when making pH measurements. It has been found, however, as will appear below, that the glasses of Perley which incorporate lanthana or other oxides of the lanthanide series have a pronounced difference in their characteristics in comparison to the yttrium containing alkali metal silicate glasses of the present invention. This is remarkable in view of the fact that the general chemical properties of yttria are closely related to those of the lanthanide series. Both belong to Group IIIA of the periodic table. In some instances yttria is even classified with the "rare earths," a particularly obsolete name, usually applied only to what now are called the "lanthanides" (lanthanum and its 14 successors).

The most useful range of compositions of the glasses of the present invention, besides a comparison of the yttrium glasses of the invention with the prior art lanthanum glasses, will become apparent from the compositions set out in Table I below. This table shows lithium silicate glasses in mol proportions some including yttrium alone, yttrium in combination with oxides of the lanthanide series, and lanthanum alone. The resistance of the bulbs formed of their respective glasses are indicated, the resistance being typical values for several bulbs of each composition, each bulb being about 12 millimeters in diameter. Also the weight of the bulbs are indicated except for a few glasses for which the data are not now available and the ratio of the resistance to the weight for each bulb is indicated to provide a comparison of the resistances taking in consideration the weights of the bulbs. In other words, the resistances of two glasses are not necessarily equal even though the bulbs show equal resistances if the weights of the bulbs being measured are different. Generally the resistance values were obtained within a few hours of manufacture of the bulbs and made at room temperature, about 23.5° C. It will be recognized by those skilled in the art that these resistance values will increase somewhat with bulb age.

having only 28 mol proportions of lithia, less than that of glasses Nos. 28 to 30, therefore is the only practical lanthanide glass. However, it showed resistances between 8 and 15 megohms and a resistance to weight ratio of 71.5, both values being substantially greater than those for the yttrium glasses Nos. 5 to 25. Therefore, it is seen that glasses containing yttria behave in a conspicuously different manner than those containing lanthana alone.

*Table I*

| Glass No. | Composition in Mol Proportions Calculated from Prefusion Mixture | | | Bulb Weight, W (grams) | Resistance R (megohms) | Average R/W (megohms per gram) |
|---|---|---|---|---|---|---|
| | $Li_2O$ | $SiO_2$ | Stabilizer | | | |
| 1 | 22 | 72 | 6 $Y_2O_3$ | .100 | 50–60 | 5 |
| 2 | 22 | 68 | 10 $Y_2O_3$ | .115 | 200–250 | 1,950 |
| 3 | 26 | 62 | 12 $Y_2O_3$ | .156 | 40–50 | 260 |
| 4 | 26 | 72 | 2 $Y_2O_3$ | .090 | 8–12 | 188 |
| 5 | 28 | 67 | 5 $Y_2O_3$ | .167 | 3–6 | 11 |
| 6 | 28 | 66 | 6 $Y_2O_3$ | | 4–6 | 27 |
| 7 | 28.5 | 66 | 5.5 $Y_2O_3$ | .098 | 4–6 | 51 |
| 8 | 29 | 65 | 6 $Y_2O_3$ | | 3–4 | 0 |
| 9 | 29.5 | 64 | 6.5 $Y_2O_3$ | .099 | 3–4 | 35 |
| 10 | 30 | 65 | 5 $Y_2O_3$ | .180 | 4–6 | 29.4 |
| 11 | 31 | 63 | 6 $Y_2O_3$ | | 4–6 | 6 |
| 12 | 32 | 58 | 10 $Y_2O_3$ | .141 | 3–4 | 24 |
| 13 | 34 | 58.5 | 6.4 $Y_2O_3$ | | 1–2 | 8 |
| 14 | 36 | 60 | 4 $Y_2O_3$ | .108 | .5–1 | 6 |
| 15 | 36 | 60 | 4 $Y_2O_3$+2 $La_2O_3$ | .163 | 1–2 | 9.95 |
| 16 | 36 | 60 | 4 $Y_2O_3$+2 $Ce_2O_3$ | .150 | 1–2 | 1021 |
| 17 | 36 | 60 | 4 $Y_2O_3$+2 $Pr_2O_3$ | .159 | 1–2 | 9..0 |
| 18 | 30 | 61 | 6 $Y_2O_3$+3 $Pr_2O_3$ | .155 | 2–3 | 1645 |
| 19 | 36 | 60 | 4 $Y_2O_3$+2 $Nd_2O_3$ | .162 | 1–2 | 9..1 |
| 20 | 36 | 60 | 4 $Y_2O_3$+2 $Sm_2O_3$ | .167 | 1–2 | 9.27 |
| 21 | 36 | 60 | 4 $Y_2O_3$+2 $Gd_2O_3$ | .170 | 1–2 | 8.00 |
| 22 | 36 | 60 | 4 $Y_2O_3$+2 $Dy_2O_3$ | .172 | 1–2 | 8.82 |
| 23 | 36 | 60 | 4 $Y_2O_3$+2 $Ho_2O_3$ | .174 | 1–2 | 8.73 |
| 24 | 36 | 60 | 4 $Y_2O_3$+2 $Er_2O_3$ | .160 | 1–2 | 8.62 |
| 25 | 36 | 60 | 4 $Y_2O_3$+2 $Yb_2O_3$ | .173 | 1–2 | 8.39 |
| 26 | 30 | 63 | 6 $Y_2O_3$+1 $Pr_2O_3$ | | 4–6 | 67 |
| 27 | 28 | 67 | 5 $La_2O_3$ | .161 | 8–15 | 71 |
| 28 | 30 | 60 | 10 $La_2O_3$ | | | 5 |
| 29 | 35 | 60 | 5 $La_2O_3$ | | | |
| 30 | 36 | 60 | 4 $La_2O_3$ | .15 | 1–2 | 9.94 |

It is seen from Table I that as the content of the lithia in the glasses increases, the resistance of the glasses decreases markedly. The resistances of glasses Nos. 1 to 3 are more or less of the same order as conventional ion sensitive glass electrodes whereas the resistance of glass No. 4 is relatively small, on the order of 8 to 10 megohms. This glass includes 26 mol proportions of lithia. However, when the lithia content is increased to 28 mol proportions as indicated in glasses Nos. 5 and 6 the resistance thereof is reduced a substantial amount, on the order of one-third to one-fourth less than that of glass No. 4. The difference in the resistances of the glasses Nos. 4 and 5 is more apparent when making reference to the ratio of the resistance to the weight as indicated in the last column of Table I. Glasses Nos. 7 through 25 which all include more than 28 mol proportions of lithia have resistances of 6 megohms or less. Therefore, it is seen that there is a decided breaking point in the resistance of the glasses of the invention between those glasses having 26 mol proportions of lithia or less and those having 28 mol proportion and greater, the latter glasses having resistances lower than any herebefore found in the art.

Now referring to glasses Nos. 27 to 30 in Table I, each of which includes only lanthanum as the stabilizer, it is seen that only glasses Nos. 27 and 30 include resistance measurements. Glasses Nos. 28 and 29 cracked off the stem to which they were sealed a short time after their manufacture, devitrified and were soluble in water. Therefore, no resistance measurements were made of these glasses. A resistance measurement of 1 to 2 megohms was obtained for glass No. 30 but the bulb also cracked off the stem and devitrified. Thus, glasses Nos. 28 to 30 were not commercially practical. Glass No. 27

Lithium silicate glasses utilizing as stabilizers $Ce_2O_3$, $Pr_2O_3$ and $Nd_2O_3$, rather than yttria or lanthanum also have been made which have low resistances on the same order as that when utilizing yttria but are not considered particularly useful since a short while after forming the bulbs on the conventional stems, the bulbs crack off the stems and, furthermore, one or more of the glasses were difficult to melt. Therefore, it is apparent that yttria is required as the component of the stabilizer in the present invention to provide a commercially practical glass having all the desired characteristics described previously.

It is further seen from Table I that the glasses of the invention having the lowest resistance are those which include yttria in combination with an oxide of the lanthanide series, namely glasses Nos. 15 to 26. The addition of a small amount of a lanthanide series oxide to the aforementioned glasses provides not only the advantage of enchancing the low resistivity of the glasses but also considerably reduces the sodium ion response of the glasses in comparison to those glasses containing yttrium alone as the stabilizer. Those glasses containing only yttrium as the stabilizer, although having low resistance, also have the property of higher alkali error than yttrium glasses having an oxide of the lanthanide series added thereto, or than lanthanum glasses as in the aforementioned Perely patent which contain no yttrium. This will become more apparent by making reference to Table II below which shows pH readings made with glasses listed in the table which were placed first in a 12.45 buffer (saturated calcium hydroxide solution) and subsequently immersed in a mixture of this buffer with sodium ion in strengths of 0.001 N, 0.01 N, 0.1 N and 1 N.

Table II

| | 0.001 N | 0.01 N | 0.1 N | 1 N | Average pH change |
|---|---|---|---|---|---|
| Glass No. 5 (Si, Li, Y): | | | | | |
| pH reading | 12.20 | 11.70 | 11.33 | 10.30 | |
| pH change | | .50 | .37 | 1.03 | 0.63 |
| Glass No. 27 (Si, Li, La): | | | | | |
| pH reading | 12.25 | 12.10 | 11.85 | 11.50 | |
| pH change | | .15 | .25 | .35 | 0.25 |
| Glass No. 26 (Si, Li, Y, Pr): | | | | | |
| pH reading | 12.60 | 12.47 | 12.13 | 11.63 | |
| pH change | | .13 | .34 | .50 | 0.32 |
| 015 Glass: | | | | | |
| pH reading | 12.30 | 12.05 | 11.60 | 10.92 | |
| pH change | | .25 | .45 | .68 | 0.46 |

The horizontal columns referenced "pH change" in Table II indicate the difference in the readings between each decade change of the normality of the solutions tested. The pH change between the different solutions provides an indication of the magnitude of the response of the glasses to the sodium ions in the solutions. Consequently, the larger the pH change, the greater the sodium error. It is seen in Table II that glasses Nos. 5 and 27 which have the same content of lithia and silica but differ in that glass No. 5 contains 5% yttria while glass No. 27 contains 5% lanthana, the yttrium glass has over two times as much response to sodium as the lanthanum glass. Now comparing glass No. 26, it is seen that the addition of praseodymia, an oxide of the lanthanide series, to an yttrium glass results in a glass which has a sodium error comparable to that of a lanthanum glass and only half as much as that of the yttrium glass, glass No. 5. The glass referred to as 015 glass is a conventional soda lime glass that is used for potential measurements. This glass has a sodium response greater than either glasses Nos. 26 and 27. It is seen from Table II, therefore, that a lithia silicate glass containing yttria and an oxide of the lanthanide series has a sodium error somewhat less than that of a yttrium glass or a conventional soda lime glass but similar to that of a lithia silica lanthana glass.

The glass of the present invention also includes sodium silicates which include stabilizers selected from the group consisting of yttria and yttria in combination with an oxide of the lanthanide series. An example of a useful sodium silicate glass of the invention is one having 65 mol percent $SiO_2$, 30 mol percent $Na_2O$ and 5 mol percent $Y_2O_3$. Such a glass has been found to have even lower resistance than that of the lithium glasses in Table I. The range of resistances of glasses of this composition is 0.6 to 0.8 megohm. The average weight of the glass bulbs was 0.16 gram; therefore, the resistance to weight ratio is 4.6, even lower than that of lithium glasses in Table I. This glass, however, has greater sodium error than the lithium glasses and, therefore, the addition of an oxide of the lanthanide series of the glass renders the glass more useful for hydrogen ion measurements. An example of such a glass is one having 57.2 mol percent $SiO_2$, 31.2 mol percent $Na_2O$, 4 mol percent $Y_2O_3$ 2.8 mol percent $Pr_2O_3$ and 4.8 mol percent $TiO_2$. This glass has a resistance of 1 megohm or less and a resistance to weight ratio of about 5 to 6. The addition of titanium to this glass renders the glass reworkable, that is, the glass may be repeatedly reheated and still remain isotropic, and therefore may be reblown. It has been found, however, that the addition of yttrium to a potassium silicate glass does not provide the same results as when it is added to either lithium or sodium silicate glasses. For example, a glass has been made having 65.2 mol percent silica, 28.8 mol percent potassium oxide and 6 mol percent yttria. The glass could be melted and fabricated but the resistance was on the order of 500 megohms. Furthermore, the glass had an extremely high lithium response and high viscosity. Therefore, potassium silicate glasses do not fall within the scope of the present invention.

In view of the data given above, it is seen that the most useful range of composition of the present invention, to obtain exeremely low resistivity on the order of 6 megohms or less, is 28 to 38 mol proportions of either $Li_2O$ or $Na_2O$, 57 to 68 mol proportions $SiO_2$ and 4 to about 14 mol proportions of $Y_2O_3$ alone or $Y_2O_3$ in combination with an oxide of the lanthanide series. It should also be appreciated that certain other constituents may be added to the glass of the present invention without destroying its characteristics. For example, as in the case of the sodium glass mentioned above, titanium may be added to render the glasses reworkable. It is believed that about 0 to 5 mol proportions of titanium may replace an an equal amount of the silica in either the sodium or lithium glasses the invention to make the glasses reworkable and will not destroy the low resistance characteristics of the glasses. However, the total amount of the network forming oxides of silica and titania should amount to about 57 mol proportion of the glass composition.

In general, it is found that within the useful ranges of the glass composition of the invention the resistance will be at its lowest when the alkali metal oxide is maximized. The amount of stabilizer provided in the glass is not critical in determining the resistivity of the glass, it being generally sufficient if there is between 4 to about 14 mol proportions of the stabilizer. The lack of substantial influence of the stabilizer to the resistivity of the glasses may be best appreciated by comparing glass Nos. 2 and 12 in Table I in which both include 10 mol proportions of yttria. It is seen that although the yttria in these glasses was equal, the resistivity of glass No. 12 having 32 mol proportions of lithia is about 60 times less than that of glass No. 2. A same type of comparison can be made between glass No. 1 having only 22 mol proportions of lithia and 6 mol proportions of yttria and glasses Nos. 5 to 11 having approximately the same amount of yttria but with a substantially greater proportion of lithia and a substantially less resistance. If the alkali metal oxide exceeds 38 mol proportions the glass becomes rather unstable, that is, it tends to dissolve in water. Furthermore, an increase of the stabilizer component metal oxide above about 14 mol proportions increases the resistance of the glass and makes it more refractory. Increasing the silica more than 68 mol proportions raises the resistance of the glass and also makes it viscous and difficult to work. While the particular composition of the glass of the invention may be selected to meet any of a number of requirements, it is presently believed that the preferred composition for general use is a glass having a composition in the order of 34 to 36 mol proportions of lithia or soda, 58 to 60 mol proportions of silica and 4 to 6 mol proportions of either yttria along or yttria in combination with an oxide of the lanthanide series.

The glasses of the invention are all made in the conventional manner, the starting components ordinarily being lithium carbonate or sodium carbonate, silica and yttria, with the quantity selected to give the desired ratio in the resultant glass. In the preferred method of manufacture, the constituents are melted in a crucible to a molten mass and refined to a bubble-free magma, then one end of a stem or tube of glass is dipped into the molten mass to pick up a gob of glass on the stem, and the gob is blown into a thin membrane bulb, as more fully described in U.S. patent to Cary and Baxter, No. 2,346,470.

A glass of the present invention has excellent physical and electrical characteristics and is easily fabricated over a wide range of proportions permitting selection of the resistance to meed different applications. The glass is exceptionally stable and membranes formed from the glass have been exposed to moist air for more than two years without deterioration and have been used thereafter for accurate measurements.

In the manufacture of glasses of the invention, small quantities of volatile salts and other materials, such as vitreous colors and collodial metals may be included in the starting mixture as an additive. Materials such as nitrates, chlorides, hydrates, silica fluorides, arsenic oxide and antimony oxide, are conventionally used as fluxes in facilitating fusion in glass making. These materials decompose and volatilize during the heating and ordinarily only a small portion, if any, of the initial quantity remains in the finished glass. The boiling off of the volatile materials may also provide a stirring of the melt. The vitreous colors and collodial metals ordinarily remain in the finished glass and may be used for identification purposes.

Only a few mol proportions of the additives discussed in the preceding paragraph will be used in the glass, the normal range being from 0 to about 4 mol proportions. The proportion is the finished glass usually will be lower, as ordinarily at least a portion of the additive is boiled away.

Hence, the mixtures described herein may include a few mol proportions of one or more additives and reference in the specification and claims to a glass comprising essentially an alkali metal silicate glass with yttria or yttria combined with one or more oxides of the lanthanide series is not intended to exclude the presence of such additives or other constitutents which do not change the novel characteristics of the glass of the present invention.

What is claimed is:

1. A low resistance glass for hydrogen ion potential measurement consisting essentially of an yttrium-alkali metal-silicate glass free of alkaline earth metals and containing 4 to about 14 mol proportions of a substance, said substance being selected from the group consisting of yttria alone and an admixture of an oxide of the lanthanide series and at least 4 mol proportions of yttria with the mol proportions of yttria exceeding the mol proportions of the oxide of the lathanide series in said admixture, and 28 to 38 mol proportions of a single alkali metal oxide selected from the group consisting of lithia and soda, and 57 to 68 mol proportions of silica.

2. A low resistance glass for hydrogen ion potential measurement consisting essentially of an yttrium-lithium-silicate glass free of alkaline earth metals and containing 4 to about 14 mol proportions of a substance, said substance being selected from the group consisting of yttria alone and an admixture of an oxide of the lanthanide series and at least 4 mol proportions of yttria with the mol proportions of yttria exceeding the mol proportions of the oxide of the lanthanide series in said admixture, 28 to 38 mol proportions of lithia, 57 to 68 mol proportions of silica and said glass being essentially free of alkali metal oxides other than lithia.

3. A low resistance glass for hydrogen ion potential measurement consisting essentially of an yttrium-lithium-silicate glass free of alkaline earth metals and containing 4 to 10 mol proportions of a substance, said substance being selected from the group consisting of yttria alone and an admixture of at least 1 and up to 3 mol proportions of an oxide of the lanthanide series and 4 to 6 mol proportions of yttria, 30 to 36 mol proportions of lithia, 58 to 60 mol proportions of silica and said glass being essentially free of alkali metal oxides other than lithia.

4. A glass as set forth in claim 1 wherein between 0 to 5 mol proportions of said silica is replaced with an equal amount of titanium dioxide, and the total amount of said silica and titanium dioxide is greater than about 57 mol proportions of said glass.

5. A low resistance glass for hydrogen ion potential measurement consisting essentially of a lanthanide metal-yttrium-lithium-silicate glass free of alkaline earth metals and containing in mol proportions about 36 lithia, 60 silica, 4 yttria and 2 mol proportions of an oxide of the lanthanide series.

6. A low resistance glass for hydrogen ion potential measurement consisting essentially of a lithium yttrium praseodymium silicate glass free of alkaline earth metals and containing in mol proportions about 36 lithia, 4 yttria, 2 praseodymia and 60 silica.

7. A low resistance glass for hydrogen ion potential measurement consisting essentially of an yttrium sodium silicate glass free of alkaline earth metals and containing in mol proportions about 57.2 silica, 31.2 soda, 4 yttria, 2.8 praseodymia and 4.8 titania.

References Cited by the Examiner

UNITED STATES PATENTS

| | | | |
|---|---|---|---|
| 2,444,845 | 7/1948 | Perley | 106—52 |
| 2,497,235 | 2/1950 | Perley | 106—52 |
| 2,668,143 | 2/1954 | Gilbert et al. | 204—195.1 |

TOBIAS E. LEVOW, *Primary Examiner.*